(12) United States Patent
Chaturvedi et al.

(10) Patent No.: US 10,095,780 B2
(45) Date of Patent: Oct. 9, 2018

(54) AUTOMATICALLY MINING PATTERNS FOR RULE BASED DATA STANDARDIZATION SYSTEMS

(71) Applicant: International Business Machines Corporation, Armonk, NY (US)

(72) Inventors: Snigdha Chaturvedi, Pittsburgh, PA (US); Tanveer A. Faruquie, White Plains, NY (US); Hima P. Karanam, New Delhi (IN); Marvin Mendelssohn, Melrose, MA (US); Mukesh K. Mohania, New Delhi (IN); L. Venkata Subramaniam, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/426,438

(22) Filed: Feb. 7, 2017

(65) Prior Publication Data

US 2017/0147688 A1     May 25, 2017

Related U.S. Application Data

(63) Continuation of application No. 13/414,374, filed on Mar. 7, 2012.

(51) Int. Cl.
    *G06F 17/30*     (2006.01)
    *G06F 17/27*     (2006.01)
(52) U.S. Cl.
    CPC .... *G06F 17/30705* (2013.01); *G06F 17/2775* (2013.01); *G06F 17/30675* (2013.01); *G06F 2216/03* (2013.01)

(58) Field of Classification Search
    CPC .............. G06F 17/3053; G06F 17/2715; G06F 17/30687; G06F 17/30705; G06F 19/24; G06F 19/707; G06F 17/2775; G06F 17/30675; G06F 2216/03
    See application file for complete search history.

(56) References Cited

U.S. PATENT DOCUMENTS

| | | | |
|---|---|---|---|
| 6,092,065 A | 7/2000 | Floratos | |
| 6,523,026 B1* | 2/2003 | Gillis | G06F 17/30637 |
| 6,671,404 B1* | 12/2003 | Kawatani | G06K 9/6232 |
| | | | 382/190 |
| 7,225,181 B2 | 5/2007 | Tsuda | |

(Continued)

OTHER PUBLICATIONS

Xiaonan Ji (Xiaonan Ji et al. "An efficient technique for mining approximately frequent substring patterns," IEEE, 2007 pp. 325-330).*

(Continued)

*Primary Examiner* — Noosha Arjomandi
(74) *Attorney, Agent, or Firm* — Susan Murray; Edell, Shapiro & Finnan, LLC

(57) ABSTRACT

Computer program products and systems are provided for mining for sub-patterns within a text data set. The embodiments facilitate finding a set of N frequently occurring sub-patterns within the data set, extracting the N sub-patterns from the data set, and clustering the extracted sub-patterns into K groups, where each extracted sub-pattern is placed within the same group with other extracted sub-patterns based upon a distance value D that determines a degree of similarity between the sub-pattern and every other sub-pattern within the same group.

14 Claims, 2 Drawing Sheets

(56) References Cited

U.S. PATENT DOCUMENTS

| | | | |
|---|---|---|---|
| 7,493,346 | B2 | 2/2009 | Chi et al. |
| 7,502,995 | B2 | 3/2009 | Takagi |
| 7,590,628 | B2 * | 9/2009 | Zhao .................. G06F 17/3071 |
| 7,865,358 | B2 | 1/2011 | Green et al. |
| 8,200,670 | B1 * | 6/2012 | Flaster ................ G06F 17/3071 707/602 |
| 8,428,935 | B2 | 4/2013 | Waelti et al. |
| 8,838,593 | B2 | 9/2014 | Apanowicz |
| 9,251,525 | B2 | 2/2016 | Picault |
| 9,336,302 | B1 | 5/2016 | Swamy |
| 9,639,549 | B2 | 5/2017 | Goldberg |
| 2003/0161504 | A1 * | 8/2003 | Inoue ................. G06K 9/00221 382/115 |
| 2003/0182284 | A1 | 9/2003 | Russell |
| 2004/0107059 | A1 | 6/2004 | Happel |
| 2004/0107203 | A1 | 6/2004 | Burdick et al. |
| 2005/0038818 | A1 | 2/2005 | Hooks |
| 2005/0165566 | A1 | 7/2005 | Happel |
| 2005/0171948 | A1 * | 8/2005 | Knight .............. G06F 17/30616 |
| 2005/0278324 | A1 | 12/2005 | Fan et al. |
| 2006/0074824 | A1 | 4/2006 | Li |
| 2007/0240031 | A1 | 10/2007 | Zhao |
| 2008/0005265 | A1 | 1/2008 | Miettinen |
| 2008/0152231 | A1 * | 6/2008 | Gokturk ............ G06F 17/30256 382/209 |
| 2009/0307213 | A1 | 12/2009 | Deng |
| 2010/0223276 | A1 | 9/2010 | Al-Shameri |
| 2010/0250596 | A1 | 9/2010 | Fan et al. |
| 2010/0257145 | A1 | 10/2010 | Felsheim |
| 2010/0293090 | A1 | 11/2010 | Domenikos |
| 2011/0047171 | A1 | 2/2011 | Paparizos |
| 2011/0196872 | A1 | 8/2011 | Sims et al. |
| 2012/0078612 | A1 | 3/2012 | Kandekar et al. |
| 2013/0238610 | A1 | 9/2013 | Chaturvedi |
| 2013/0238611 | A1 | 9/2013 | Chaturvedi |
| 2014/0089287 | A1 * | 3/2014 | Connolly .......... G06F 17/30991 707/707 |
| 2014/0164376 | A1 | 6/2014 | Yang |
| 2017/0147688 | A1 * | 5/2017 | Chaturvedi ....... G06F 17/30705 |

OTHER PUBLICATIONS

Gonzalo Navarro, "A Guided Tour to Approximate String Matching", University of Chile, ACM Computing Surveys, vol. 33, No. 1, Mar. 2001, pp. 31-88.
Xiaonan Ji et al., "An Efficient Technique for Mining Approximately Frequent Substring Patterns", Seventh IEEE International Conference on Data Mining—Workshops, NICTA Victoria Laboratory Department of Computer Science and Software Engineering University of Melbourne, Australia, pp. 325-330.
Christian Siefkes, "An Overview and Classification of Adaptive Approaches to Information Extraction", S. Spaccapietra et al. (Eds.): Journal on Data Semantics IV, LNCS 3730, Springer-Verlag Berlin Heidelberg 2005, pp. 172-212.
Marti A. Hearst, "Automatic Acquisition of Hyponyms Large Text Corpora", Computer Science Division, 571 Evans Hall, University of California, Berkeley, Berkeley, CA and Xerox Palo Alto Research Center, pp. 539-545.
Ezeiza N. et al., "Combining Stochastic and Rule-Based Methods for Disambiguation in Agglutinative Languages", pp. 379-384.
Gary M. Weiss et al., "Data Mining", To appear in the Handbook of Technology Management, H. Bidgoli (Ed.), John Wiley and Sons, 2010. pp. 1-17.
Sun Wu, et al., "Fast Text Searching", Communications of the ACM/Oct. 1992/vol. 35, No. 10, pp. 83-91.
Jiawei Han, et al., "FreeSpan: Frequent Pattern-Projected Sequential Pattern Mining", KDD 2000, Boston, MA USA, ACM 2000 1-58113-233-6/00/08; pp. 355-359.
Ronen Feldman, et al., "Hybrid Semantic Tagging for Information Extraction", WWW 2005, May 10-14, 2005, Chiba, Japan, 2 pages.
Jane Morris, et al., "Lexical Cohesion Computed by Thesaural Relations as an Indicator of the Structure of Text", 1991 Association for Computational Linguistics, Computational Linguistics, vol. 17, No. 1, pp. 21-48.
Joseph L. Hellerstein, et al., "Mining Event Data for Actionable Patterns", IBM T.J. Watson Research Center Hawthorne, New York, 12 pages.
Ramakrishnan Srikant, et al., "Mining Quantitative Association Rules in Large Relational Tables", SIGMOD '96 Jun. 1996 Montreal, Canada 6 ACM 0-89791-794-4/96 10006, 12 pages.
Naohiko Uramoto, "Positioning Unknown Words in a Thesaurus by Using Information Extracted from a Corpus", IBM Research, Tokyo Research Laboratory, Kanagawa-ken, Japan, pp. 956-961.
Grace Ngai, et al., "Rule Writing or Annotation: Cost-Efficient Resource Usage for Base Noun Phrase Chunking", Department of Computer Science, Johns Hopkins University, Baltimore, MD, 9 pages.
Jan Hajic, et al., "Serial Combination of Rules and Statistics: A Case Study in Czech Tagging", 8 pages.
Udo Hahn, et al., "Towards Text Knowledge Engineering", Computational Linguistics Group Text Knowledge Engineering Lab, Freiburg University, Freiburg, Germany, 8 pages.
Xiaonan Jiet et al. "An efficient technique for mining approximately frequent substring patterns," IEEE, 2007 pp. 325-330.
T. Soni Madhulatha, An Overview on Clustering Methods, Apr. 2012, 7 pages.
Guralnik et al., A Scalable Algorithm for Clustering Sequential Data, 2001, 8 pages.

* cited by examiner

AUTOMATICALLY MINING PATTERNS FOR RULE BASED DATA STANDARDIZATION SYSTEMS

RELATED APPLICATIONS

This application is a continuation application of copending U.S. patent application Ser. No. 13/414,374, filed in the U.S. Patent and Trademark Office on Mar. 7, 2012, the contents of which are incorporated by reference herein in its entirety.

BACKGROUND

1. Technical Field

The present invention relates to the field of data mining and establishing patterns in data.

2. Discussion of the Related Art

Enterprises store significant quantities of data as information assets. However, this data is often in the form of free text and is of poor quality. In order to increase the quality and usefulness of the data, the data is standardized by employing rule based data standardization systems in which domain experts manually code rules for handling important and prevalent patterns.

A lexicon may be composed for establishing patterns in text data. Consider, for example, a fictitious noisy record such as "256 B Smith Towers HL Road Somecity 45". This record may be represented with the following expression referred to as the following pattern: (^++R+SC^), where "^" is a marker representing a number (e.g., "256" and "45"), "+" is a marker representing unknown text (e.g., "B Smith" and "HL"), and "R", "S" and "C" are markers representing a building (e.g., "Towers"), a street (e.g., "Road") and a city (e.g., "Somecity"). The text data is typically represented in a manner such as this in order to identify various semantic entities and also to identify and correct mistakes (also referred to as standardization of text) or missing text. For example the above text is segmented into various components such as door number (256 B), building name (SMITH), and building type (TOWERS), StreetName (HL), Street type (ROAD), CITY (SOMECITY) and PIN (45). To identify such segments from the text data as above one has to identify the important sub-patterns from the input text which represent a single semantic element. For example, the sub-pattern "^+" identifies the door number, "+R" represents the building information of which first half represents the building name and the second half represents the building type. Similarly, other sub-patterns for Street information, city and pin are "+S", "C", and "^" respectively.

Finding patterns in text can be laborious and time consuming, particularly for noisy or highly specialized data sets such as the previous example. In particular, domain experts must hand craft the pattern rules, and this can be a very time consuming and costly process. Finding such patterns can also be subjective to the persons determining the patterns.

BRIEF SUMMARY

Accordingly, embodiments of the present invention include a method, a computer program product and a system for automatically mining data patterns in text data, wherein the embodiments comprise finding a set of N frequently occurring sub-patterns within the data set, extracting the N sub-patterns from the data set, and clustering the extracted sub-patterns into K groups, where each extracted sub-pattern is placed within the same group with other extracted sub-patterns based upon a distance value D that determines a degree of similarity between the sub-pattern and every other sub-pattern within the same group.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

In an example embodiment of the present invention, sub-patterns are automatically identified in a text data corpus, in which data rules are initially assigned to text in data records so as to establish patterns of text. A set of frequently occurring sub-patterns are automatically identified by the system, and these sub-patterns are clustered into groups of related sub-patterns.

Figure 1:
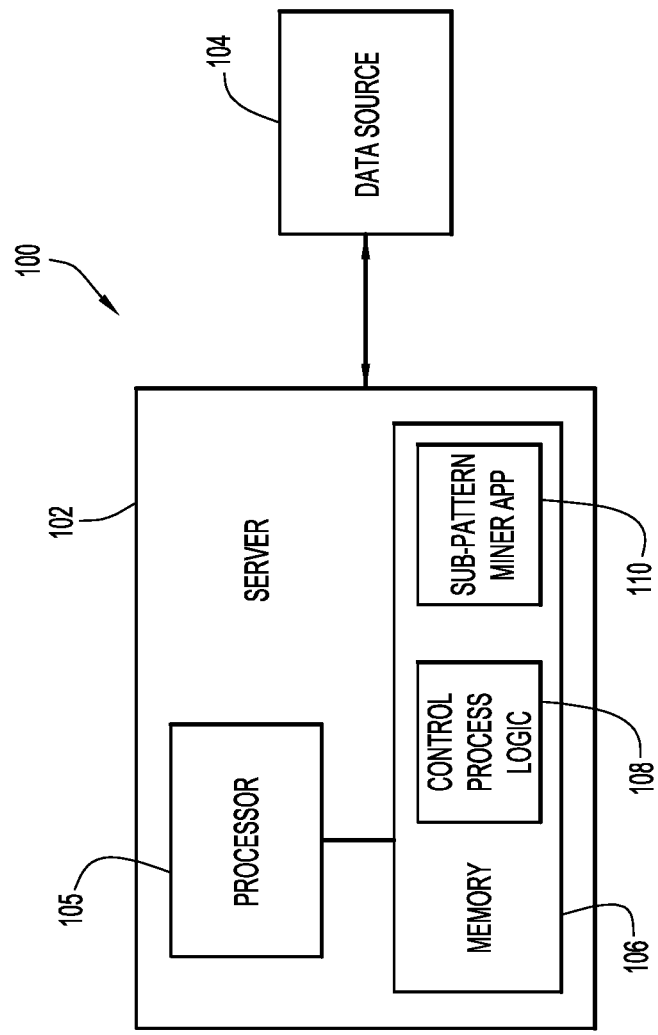
FIG. 1 is a diagrammatic illustration of an example data mining system in accordance with an example embodiment of the present invention.

As depicted in FIG. 1, a system 100 includes a data mining server 102 and a data source 104. The data source 104 comprises one or more databases including text data records of any number of different types that are accessible by the server 102. The server 102 includes central processing unit or processor 105 and a primary storage in the form of memory 106 (e.g., RAM and/or ROM). The memory 106 includes control process logic 108 including the operating system code for the processor 104 and application code for applications run by the server 102, including a sub-pattern miner application 104. The server can also include additional or secondary storage (e.g., optical and/or magnetic disk storage). Data and program information can also be stored and accessed from the secondary storage.

The server 102 can communicate with the data source 104 via any suitable connection including, without limitation, via cloud computing, via network computing in which the server 102 is operatively coupled to one or more other servers or other devices via any suitable type of carrier wave or signal for transfer of data from one source to another utilizing a suitable communication medium (e.g., bulletin board, network, LAN, WAN, Intranet, Internet, etc.).

Each of the server and data source can be configured as any suitable computer systems implemented by any type of hardware and/or other processing circuitry. In particular, the server and data source may be implemented by any quantity of conventional or other computer systems or devices (e.g., computer terminals, personal computers of all configurations, tablet, laptop, etc.), cellular telephones, personal data assistants etc., and may include any available operating system and any available or custom software (e.g., browser software, communications software, word processing software, etc.). These systems may include types of displays and input devices (e.g., keyboard, mouse, voice recognition, etc.) to enter and/or view information.

The data mining server 102 obtains a corpus of text data from data source 104 and automatically mines patterns within the text data. In particular, the data mining server produces a set of frequently occurring sub-patterns by extracting the frequently occurring text sub-patterns from a larger set of data. The extracted sub-patterns are then clustered into groups by combining similar sub-patterns into the same group. The groups are ranked based upon most frequently occurring sub-patterns, and representative sub-patterns are also selected from each group. This data mining technique identifies the most frequently occurring sub-patterns and the most common or representative form of such sub-patterns, which renders it easier for writing data standardization rules for the corpus of data.

Figure 2:
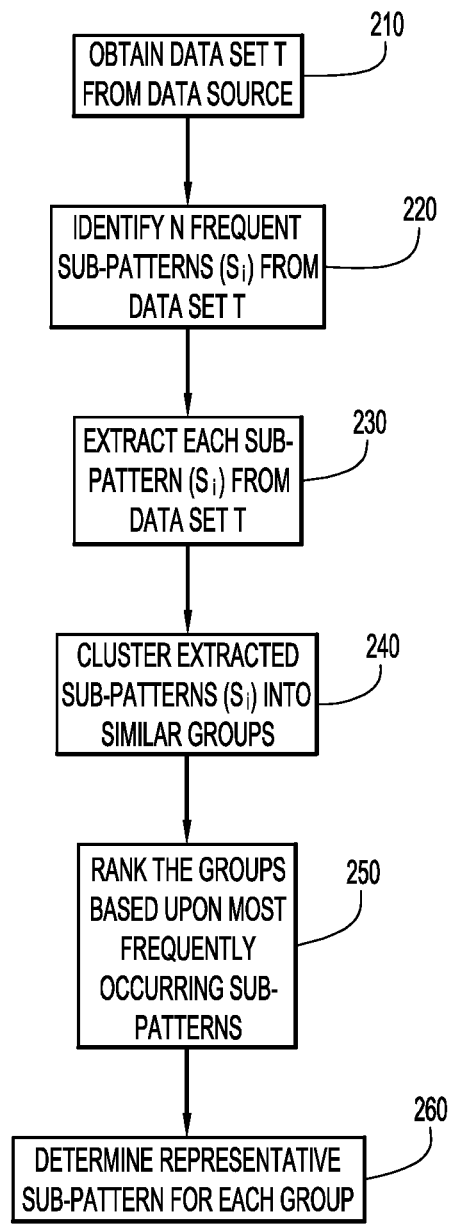
FIG. 2 is a flow chart depicting operational steps of automatically mining text data in accordance with an example embodiment of the present invention.

Referring to FIG. 2, a data set T comprising text data is initially obtained from the data source 104 for analysis by the server 102 utilizing the sub-pattern miner application 110 (step 210). After acquiring the data set T, the processor 105, utilizing sub-pattern miner application 110, analyzes the text data to find patterns. The data may be provided, e.g., in a series of records. Any suitable algorithm can be utilized to find sub-patterns of text by identifying textual phrases or portions of text that are identical throughout the corpus of text data. In addition, a series of initial rules may be applied to find frequently occurring patterns of text based upon the general knowledge of the corpus of data records being analyzed. For example, in scenarios in which data records are being analyzed that are known to contain dates, addresses, etc., certain sub-patterns that are expected to frequently occur (e.g., a series of numerical digits representing a date) can be identified and used to assist in finding frequently occurring patterns of text. Alternatively, or in addition to identifying an initial set of rules, patterns of text can be searched that may occur within a predetermined string length (e.g., within a length of no more than 10 consecutive characters). Based upon this analysis, the most frequent sub-patterns are identified (step 220).

In an example embodiment, N of the most frequent sub-patterns of text are identified from the text data in the data set T (where N can be any predetermined number). A sub-pattern can be identified, e.g., if the sub-pattern occurs at least a selected number of times (e.g., two or more times) within the data set T. A sub-pattern can be defined as a string of text having a length of no greater than a selected number of characters or symbols (e.g., 10 consecutive characters and/or symbols or less) that has been repeated at least the selected number of times within the data set T. The frequency and location within the data set T (e.g., location within each data record) of each identified sub-pattern is determined, and the N most frequent sub-patterns (i.e., N sub-patterns having the greatest frequency values) are extracted from the data set (step 230). For example, consider a record that includes the following string of text: 'K+U++B+M++', in which the values 'K', 'U', 'B' and 'M' represent rule tokens for identified types of text and "+" represents un-identified types of text. In a scenario in which the string of text '++B' has been identified as a frequently occurring sub-pattern (i.e., this string of text appears at least a selected number of times throughout the data set), this string of text is extracted from the record and the record is replaced with two independent records containing 'K+U' and '+M++', respectively.

The extracted N sub-patterns are next clustered into groups based upon the similarity of the sub-patterns, where sub-patterns that are more similar to each other in relation to other sub-patterns are clustered or combined within the same group (step 240). In an example embodiment, the following distance measure is used to determine a similarity or distance value between two sub-patterns being compared:

$$D(s_1, s_2) = 1 - \frac{2*I(s_{1,2})}{I(s_1) + I(s_2)}$$

where:
D $(s_1, s_2)$=distance value for comparison between sub-patterns $s_1$ and $s_2$; and
I(s)=information content or value of a sub-pattern s, based upon a summation of information content or values associated with all characters or symbols within the sub-pattern s, also expressed as:

$$I(s) = \Sigma_{k=1}^{k=ls} I(s_{symk})$$

where:
s=$s_{sym1}$ $s_{sym2}$ $s_{sym3}$ ... $s_{symk}$ ... $s_{syml}$;
I($s_{symk}$)=information content or value of character or symbol $s_{symk}$; and
I($s_1s_2$)=information content or value of the longest common substring between $s_1$ and $s_2$.

The value of I($s_{symk}$) is determined as follows:

$$I(s_{symk}) = -\log(p(s_{symk}))$$

The equation for I($s_{symk}$) indicates that a token with more frequent occurrence in the corpus will have less information content than that one with low frequency. In particular, the probability value (p($s_{symk}$)) of a symbol $s_{symk}$ is directly proportional to the number of occurrences of that symbol in the corpus. Since the value of I($s_{symk}$) is assigned $-\log(p(s_{symk}))$, the information content or value for a sub-pattern s, namely I(s), will be greater for the symbols that occur less frequently. For example, a symbol such as "+" which occurs more frequently in the corpus will be assigned a smaller information content value (i.e., less information content) than marker strings of text which occur less frequently, such as the 'K', 'U', 'B' and 'M' designations for rule tokens as noted in the previous example.

The similarity or distance value is used to determine whether two sub-patterns are close or distinct. Consider, for example, two pairs of patterns, where the first pair is ++B and +++B and the second pair is ++B and ++U. The first pair of sub-patterns will have a greater information content (I($s_1$, $s_2$)) value than the second pair of sub-patterns, since the first pair has more similarity compared to the second pair and also since the more common symbols (e.g., "+") have a smaller I($s_{symk}$) value than less frequently occurring symbols (e.g., "B" and "U"). Thus, the I($s_1$, $s_2$) value for the first pair of sub-patterns will be determined based upon the common symbols or tokens "++B" (i.e., I(++B,+++B), which will result in a calculated I(s) value of I(++B)), while the I($s_1$, $s_2$) value for the second pair of sub-patterns will be smaller since it is based upon the common tokens "++" (i.e., I(++B,++U), which will result in a calculated I(s) value of I(++)).

Based upon the above equations, each sub-pattern $s_i$ of the extracted group N of sub-patterns is compared against every other sub-pattern $s_i$ to establish a similarity or distance value D for each combination of compared sub-patterns. The smaller D value indicates a closer distance or similarity between two sub-patterns $s_i$. For example, if two sub-patterns $s_1$ and $s_2$ are identical in character/symbol string content, their I($s_1$, $s_2$) value (i.e., longest common substring value between these two sub-patterns) would be the same as I($s_1$) and I($s_2$), resulting in a D value of 0. If sub-pattern $s_1$ and sub-pattern $s_2$, while not identical, are very close in similarity such that the value of I($s_1$, $s_2$) approaches that of I($s_1$) and/or I($s_2$), the D value will be small and approach 0 as the sub-patterns become closer in similarity to each other. In contrast, two sub-patterns that are very different will have a D value that approaches 1.

A clustering or grouping of similar sub-patterns can be achieved by grouping all sub-patterns $s_i$ having D values, when compared with each other, that fall within a particular range that is less than 1 (e.g., a D value no greater than about 0.5). So, for example, if a D value for the comparison of sub-pattern $s_1$ and $s_2$ falls below a threshold value (e.g., 0.5 or less), these two sub-patterns would be clustered into the same group. Similarly, if a D value for the comparison of sub-pattern $s_1$ and $s_3$ falls below the threshold value, these two sub-patterns would also be clustered into the same group. The comparison of each sub-pattern with every other sub-pattern in the extracted group N of sub-patterns, with further clustering or grouping of such sub-patterns into K groups of similar sub-patterns (utilizing the similarity or distance value calculation as previously described), results in organizing sub-patterns with other similar sub-patterns to assist with writing standardized rules based upon the different types of frequently occurring patterns within the text data of the corpus. The clustering group number K can be predetermined (i.e., forcing the N sub-patterns to fit within a selected number K of groups) or, alternatively, determined strictly upon how sub-patterns compare with each other based on the D value comparison of each sub-pattern with every other sub-pattern.

The K groups of clustered sub-patterns are ranked according to which groups include the most frequently occurring sub-patterns (step 250). The frequency of each sub-pattern $s_i$ has been previously determined based upon the selection of each sub-pattern initially from the data set T (i.e., N sub-patterns having the greatest frequency are selected for extraction, etc.). In particular, the K groups can be scored with a number ranking, where the lowest scores indicate a group with a sub-pattern having the greatest frequencies (e.g., the group that contains the sub-pattern $s_i$ having the greatest frequency is provided with a number ranking score of 1, the group that contains the sub-pattern $s_i$ having the second highest frequency is provided with a number ranking score of 2, etc.).

Each group is further analyzed to determine a representative sub-pattern (step 260). The representative sub-pattern $s_i$ from each group can be the sub-pattern having the greatest frequency within the group.

Thus, the embodiments of the present invention facilitate automatic mining of a text data set (which might include several tens or hundreds of thousand or even millions of data records) to find the most frequently occurring data sub-patterns, where those data sub-patterns can further be grouped based upon similarity so as to obtain a representative sub-pattern from each grouping. This automatic mining of data is a much more rapid and efficient process that reduces the time constraints and cost for manual mining of such data to find sub-patterns, and these sub-patterns that are found are further very useful for enabling the generation of data standardization rules for the data set (where the rules can be based upon the common and most frequently occurring data patterns).

Consider, for example, a data set including 65,000 or more postal address records for individuals, companies and/or other entities. By selecting, e.g., a sub-pattern length of 2-5 within the text data to determine the most frequent sub-patterns and a value of N=2000 (i.e., find the 2000 most frequently occurring sub-patterns), the 2000 most frequently occurring sub-patterns are found in a much more efficient and less timely manner in comparison to a manually generated set. Further, the organization of the sub-patterns into groups based upon similarity is achieved efficiently and quickly to facilitate a determination of which types of rules to apply for standardization of the data. Many other data sets including all variations of text data associated with different types of data records can also be mined in accordance with the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Perl, Smalltalk, C++ or the like and conventional procedural programming languages, such as the "C" programming language or similar programming languages, structured query language (SQL) for managing data in relational database management systems, etc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for mining for sub-patterns within a text data set, the system comprising:
    a data source to store the text data set; and
    a processor configured with logic to:
        find a set of N frequently occurring sub-patterns within the text data set;
        extract the N sub-patterns from the data set; and
        cluster pairs of the extracted sub-patterns into K groups such that each pair of the extracted sub-patterns is placed within the same group with other pairs of the extracted sub-patterns based upon a respective distance value D of each pair of the extracted sub-patterns that determines a degree of similarity based upon a respective longest common substring between a respective first sub-pattern and a respective second sub-pattern of the each pair of the extracted sub-patterns within the same group and also based upon values associated with characters or symbols for the respective first sub-pattern and the respective second sub-pattern of the each pair of the extracted sub-patterns within the same group, wherein:
    the value of each of the characters or the symbols is related to a respective probability value of each of the characters or the symbols in the text data set; and
    the respective distance D of the each pair of the extracted sub-patterns is related to a sum of the values of each of the characters or the symbols of the respective first sub-pattern, a sum of the values of each of the characters or the symbols of the respective second sub-pattern, and a sum of the values of each of the characters or the symbols of a longest common substring between the respective first sub-pattern and the respective second sub-pattern of the each pair of the extracted sub-patterns.

2. The system of claim 1, wherein the processor is configured to determine the respective distance value D between any two sub-patterns $s_1$ and $s_2$ of the N sub-patterns based upon the following equation:

$$D(s_1, s_2) = 1 - \frac{2 * I(s_{1,2})}{I(s_1) + I(s_2)}$$

wherein:
$I(s_1, s_2)$=value of a longest common substring between $s_1$ and $s_2$;
$I(s_1)$=value of sub-pattern $s_1$ based upon a summation of values associated with all characters or symbols within the sub-pattern $s_1$; and
$I(s_2)$=value of sub-pattern $s_2$ based upon a summation of values associated with all characters or symbols within the sub-pattern $s_2$.

3. The system of claim 1, wherein the processor is further configured with logic to:
assign a number ranking to each of the K groups based upon a frequency of occurrence of a sub-pattern within the text data set for each group.

4. The system of claim 3, wherein the processor is configured to designate a first group including a sub-pattern having a highest frequency in relation to all other sub-patterns in the first group and a second group including a sub-pattern having a highest frequency in relation to all other sub-patterns in the second group, the highest frequency associated with the first group being greater than the highest frequency associated with the second group, and the first group being ranked with a lower number than a ranking number of the second group.

5. The system of claim 1, wherein the processor is further configured with logic to select a representative sub-pattern from each of the K groups.

6. The system of claim 1, wherein:
the processor being configured with the logic to cluster the pairs of the extracted sub-patterns into the K subgroups further comprises the processor being configured with the logic to cluster the pairs of the extracted sub-patterns into the K groups such that the each pair of the extracted sub-patterns is placed in the same group with the other pairs of the extracted sub-patterns based upon a comparison of the respective distance D to a threshold value, and
the processor is further configured with the logic to assign a number ranking to each of the K groups based upon a frequency of occurrence of a sub-pattern within the text data set for each group, wherein the processor is configured to designate a first group including a sub-pattern having a highest frequency in relation to all other sub-patterns in the first group and a second group including a sub-pattern having a highest frequency in relation to all other sub-patterns in the second group, the highest frequency associated with the first group being greater than the highest frequency associated with the second group, and the first group being ranked with a lower number than a ranking number of the second group.

7. A computer program product for mining for sub-patterns within a text data set, the computer program product comprising:
a non-transitory computer readable storage medium having computer readable program code embodied therewith, the computer readable program code configured to:
find a set of N frequently occurring sub-patterns within the text data set;
extract the N sub-patterns from the text data set; and
cluster pairs of the extracted sub-patterns into K groups such that each pair of the extracted sub-patterns is placed within the same group with other pairs of the extracted sub-patterns based upon a respective distance value D of each pair of the extracted sub-patterns that determines a degree of similarity based upon a respective longest common substring between a respective first sub-pattern and a respective second sub-pattern of each pair of the extracted sub-patterns within the same group and also based upon values associated with characters or symbols for the respective first sub-pattern and the respective second sub-pattern of the each pair of the extracted sub-patterns within the same group, wherein
the value of each of the characters or the symbols is related to a respective probability value of each of the characters or the symbols in the text data set; and
the respective distance D of the each pair of the extracted sub-patterns is related to a sum of the values of each of the characters or the symbols of the respective first sub-pattern, a sum of the values of each of the characters or the symbols of the respective second sub-pattern, and a sum of the values of each of the characters or the symbols of a longest common substring between the respective first sub-pattern and the respective second sub-pattern of the each pair of the extracted sub-patterns.

8. The computer program product of claim 7, wherein the N frequently occurring sub-patterns are the N most frequently occurring sub-patterns within the text data set.

9. The computer program product of claim 7, wherein each sub-pattern has a selected length of consecutive characters or symbols within the text data set that is no greater than a selected number.

10. The computer program product of claim 7, wherein the computer readable program code is further configured to:
assign a number ranking to each of the K groups based upon a frequency of occurrence of a sub-pattern within the text data set for each group.

11. The computer program product of claim 10, wherein a first group includes a sub-pattern having a highest frequency in relation to all other sub-patterns in the first group and a second group includes a sub-pattern having a highest frequency in relation to all other sub-patterns in the second group, the highest frequency associated with the first group is greater than the highest frequency associated with the second group, and the first group is ranked with a lower number than a ranking number of the second group.

12. The computer program product of claim 7, wherein the computer readable program code is further configured to:
select a representative sub-pattern from each of the K groups.

13. The computer program product of claim 12, wherein the sub-pattern in each group of the K groups having a highest determined frequency of occurrence in relation to determined frequencies of occurrence for all other sub-patterns within each group is selected as the representative sub-pattern for each group.

14. The computer program product of claim 7, wherein:
the computer readable program code being configured to cluster the pairs of the extracted sub-patterns into the K groups further comprises the computer readable program code being configured to cluster the pairs of the extracted sub-patterns into the K groups such that the each pair of the extracted sub-patterns is placed in the same group with the other pairs of the extracted sub-patterns based upon a comparison of the respective distance D to a threshold value, and
the computer readable program code is further configured to assign a number ranking to each of the K groups based upon a frequency of occurrence of a sub-pattern within the data set for each group, wherein the processor is configured to designate a first group including a sub-pattern having a highest frequency in relation to all other sub-patterns in the first group and a second group including a sub-pattern having a highest frequency in relation to all other sub-patterns in the second group, the highest frequency associated with the first group being greater than the highest frequency associated with the second group, and the first group being ranked with a lower number than a ranking number of the second group.

* * * * *